United States Patent
Chigusa

(10) Patent No.: US 7,845,012 B2
(45) Date of Patent: Nov. 30, 2010

(54) SYSTEM AND METHOD OF INTELLIGENT AGENT IDENTIFICATION FOR VEHICLE DIAGNOSTICS

(75) Inventor: Shunsuke Chigusa, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1305 days.

(21) Appl. No.: 11/282,925

(22) Filed: Nov. 18, 2005

(65) Prior Publication Data

US 2007/0118256 A1 May 24, 2007

(51) Int. Cl.
G06F 19/00 (2006.01)
G06F 7/04 (2006.01)
G06F 17/40 (2006.01)

(52) U.S. Cl. .............................. 726/26; 701/29; 701/36
(58) Field of Classification Search .................. 726/26; 701/29, 36
See application file for complete search history.

(56) References Cited

U.S. PATENT DOCUMENTS

| | | | |
|---|---|---|---|
| 5,124,909 A | 6/1992 | Blakely et al. | |
| 5,375,207 A | 12/1994 | Blakely et al. | |
| 5,442,553 A * | 8/1995 | Parrillo | 455/420 |
| 5,870,768 A | 2/1999 | Hekmatpour | 715/501.1 |
| 5,944,783 A | 8/1999 | Nieten | |
| 5,953,514 A | 9/1999 | Gochee | |
| 6,012,152 A | 1/2000 | Douik et al. | 714/26 |
| 6,023,565 A | 2/2000 | Lawman et al. | |

(Continued)

OTHER PUBLICATIONS

Robbert-Jan Beun et al. "Ontological Feedback in Multiagent Systems" Autonomous Agents and Multi-Agent Systems '04 Conference, Jul. 19-23, 2004, New York, NY USA, pp. 110-117.

(Continued)

Primary Examiner—Kambiz Zand
Assistant Examiner—William S Powers
(74) Attorney, Agent, or Firm—Gifford, Krass, Sprinkle, Anderson & Citkowski, P.C.

(57) ABSTRACT

A system and method of intelligent agent identification for a vehicle is provided. The method including the steps of a host computer system selecting an intelligent agent and determining a slave system to receive the intelligent agent. The host system encrypts a work activity to be performed by the agent, and predetermined host identification information, and programs the encrypted work activity and predetermined host information into the selected agent. The methodology randomly generates an identification code for the selected agent and programs the code into the selected agent. The selected agent is transmitted to the selected slave system via a communication network. The slave computer system decodes the host information and agent identification code carried by the agent, and determines if the decoded host information matches corresponding host identification information stored in memory of the slave computer system. The agent is denying access to the slave computer system if the decoded host information does not correspond. The methodology continues to check the agent identity by determining if the decoded agent identification code matches a predetermined identification code stored in the memory of the slave computer system. The agent is denied access to the slave computer system if there is no match, and is allow access to the slave computer system if the decoded agent identification information matches the predetermined identification code stored in the memory of the slave computer system.

14 Claims, 2 Drawing Sheets

U.S. PATENT DOCUMENTS

| | | | |
|---|---|---|---|
| 6,047,289 A * | 4/2000 | Thorne et al. | 1/1 |
| 6,108,616 A | 8/2000 | Borchers et al. | 702/183 |
| 6,330,499 B1 * | 12/2001 | Chou et al. | 701/33 |
| 6,349,342 B1 | 2/2002 | Menges et al. | |
| 6,505,231 B1 | 1/2003 | Maruyama | |
| 6,621,895 B1 * | 9/2003 | Giese | 379/201.03 |
| 6,684,285 B2 | 1/2004 | Farmwald et al. | 710/305 |
| 6,769,125 B2 | 7/2004 | Menges et al. | |
| 6,912,522 B2 | 6/2005 | Edgar | |
| 6,950,782 B2 | 9/2005 | Qiao et al. | 702/183 |
| 6,988,279 B1 | 1/2006 | Kanevsky | |
| 6,996,667 B2 | 2/2006 | Aoki et al. | |
| 7,024,187 B2 * | 4/2006 | Moles et al. | 455/423 |
| 7,036,128 B1 | 4/2006 | Julia et al. | |
| 7,233,879 B1 | 6/2007 | Chigusa | |
| 7,356,832 B1 * | 4/2008 | Eibach et al. | 726/2 |
| 2002/0120696 A1 | 8/2002 | Mousseau et al. | |
| 2003/0026200 A1 | 2/2003 | Fu et al. | |
| 2003/0026220 A1 * | 2/2003 | Uhlik et al. | 370/328 |
| 2003/0037177 A1 | 2/2003 | Sutton et al. | |
| 2004/0205772 A1 | 10/2004 | Uszok et al. | |
| 2005/0004974 A1 | 1/2005 | Sharma et al. | |
| 2005/0027480 A1 | 2/2005 | Qiao et al. | |
| 2005/0065682 A1 * | 3/2005 | Kapadia et al. | 701/35 |
| 2005/0187668 A1 | 8/2005 | Baumgarte | |
| 2005/0216757 A1 | 9/2005 | Gardner | |
| 2006/0031538 A1 | 2/2006 | Motoyama et al. | |
| 2006/0064291 A1 | 3/2006 | Pattipatti et al. | |
| 2007/0265735 A1 | 11/2007 | Chigusa | |

OTHER PUBLICATIONS

Weiss et al., 'Design and Implementation of a Real-Time Multi-Agent System', 1998, IEEE Article, pp. 1269-1273.

Murphey et al., 'Automotive Fault Diagnosis:-Part II: A Distributed Agent Diagnostic System', Jul. 2003, IEEE Article, vol. 52, No. 4, pp. 1076-1098.

IPM, 'Wireless Vehicle Interface' IPM Article, 2000, pp. 1-2.

* cited by examiner

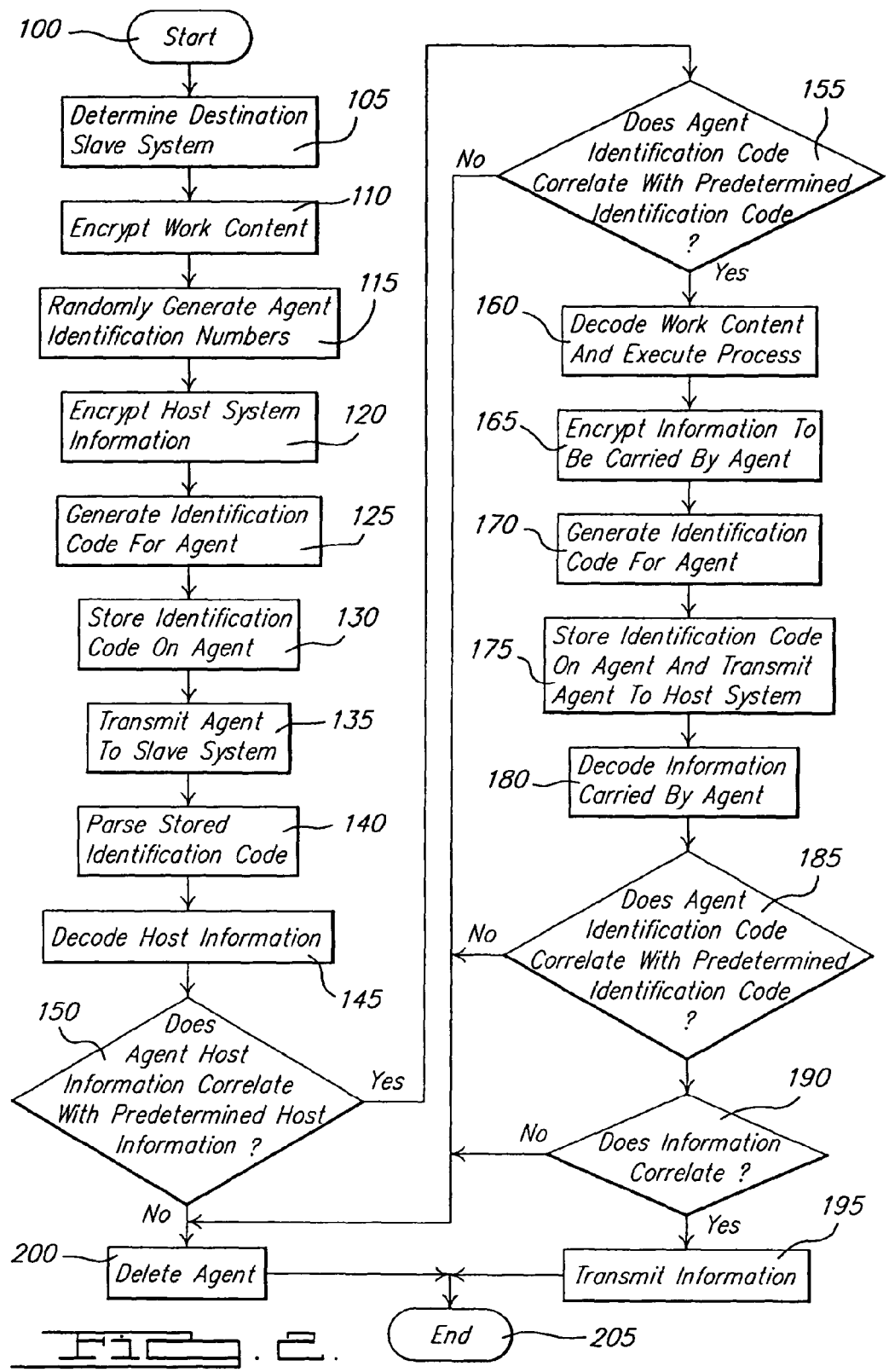

SYSTEM AND METHOD OF INTELLIGENT AGENT IDENTIFICATION FOR VEHICLE DIAGNOSTICS

BACKGROUND OF THE INVENTION

1. Field of the Invention

The present invention relates generally to computer-assisted vehicle diagnostics and, more specifically, to a system and method of intelligent agent identification for vehicle diagnostics.

2. Description of the Related Art

Vehicles, and in particular motor vehicles, frequently incorporate monitoring systems that function to monitor the status of various vehicle components. An on-board diagnostic system (OBD) is frequently utilized in monitoring the engine, emissions, transmission or other key vehicle systems. The information obtained by such a monitoring system may be useful in detecting a vehicle condition, such as a malfunction, or other such abnormal operating condition. A key feature of the on-board diagnostic system is the ability to notify the vehicle operator of the detected vehicle condition. Early detection, diagnosis, or notification of a malfunction is important to the continued operation of the vehicle.

While the on-board diagnostic systems work well, they may not provide information regarding causation. Intelligent agent diagnostic systems are known to collect and transfer data within an electronic system that may be relevant to causation. An example of a multi-agent diagnostic system for a vehicle that can detect and isolate a fault is described in commonly assigned U.S. patent application Ser. No. 10/629,035, which is incorporated herein by reference.

The above described system works well for fault isolation, but does not provide security concerning the ingress and egress of an agent to the system. Thus, there is a need in the art for a system and method of intelligent agent identification for an intelligent agent system that improves the security of the intelligent agent system by controlling the access of agents to the electronic system and the dissemination of information from a malicious agent.

SUMMARY OF THE INVENTION

Accordingly, the present invention is a system and method of intelligent agent identification for a vehicle. The system includes a host computer system having a processor, a memory associated with the processor and an input/output means. A host agent send/receive software program that admits the agent into the host computer system and sends the agent out of the host computer system is maintained by the host computer system. A host identification software program is maintained by the host computer system that manages the identity of the agent and the activity of the agent. An agent management software program is operatively maintained by the host computer system. The system also includes a slave computer system that is operatively in communication with the host computer system via a communication network, and the slave computer system has a processor, a memory associated with the processor and an input/output means. A slave identification software program is maintained by the slave computer system and a slave application software program that executes the work activity instructions carried by the identified agent to obtain information about the vehicle.

The method includes the steps of a host computer system selecting an intelligent agent and determining a slave system to receive the intelligent agent. The host system encrypts a work activity to be performed by the agent, and predetermined host identification information, and programs the encrypted work activity and predetermined host information into the selected agent. The methodology randomly generates an identification code for the selected agent and programs the code into the selected agent. The selected agent is transmitted to the selected slave system via a communication network. The slave computer system decodes the host information and agent identification code carried by the agent, and determines if the decoded host information matches corresponding host identification information stored in memory of the slave computer system. The agent is denied access to the slave computer system if the decoded host information does not correspond. The methodology continues to check the agent identity by determining if the decoded agent identification code matches a predetermined identification code stored in the memory of the slave computer system. The agent is denied access to the slave computer system if there is no match, and is allowed access to the slave computer system if the decoded agent identification information matches the predetermined identification code stored in the memory of the slave computer system.

One advantage of the present invention is that a system and method of intelligent agent identification is provided that facilitates identification of an intelligent agent within a vehicle. Another advantage of the present invention is that a system and method of intelligent agent identification is provided that controls the access of agents to an electronic system for the vehicle. A further advantage of the present invention is that a system and method of intelligent agent identification is provided that prevents future access to the electronic system by a non-identified agent.

Other features and advantages of the present invention will be readily appreciated as the same becomes better understood after reading the subsequent description taken in conjunction with the accompanying drawings.

BRIEF DESCRIPTION OF THE DRAWINGS

FIG. 2 is a flowchart illustrating the method of agent identification in an electronic system using the system of FIG. 1, according to the present invention.

DESCRIPTION OF THE PREFERRED EMBODIMENT(S)

Figure 1:
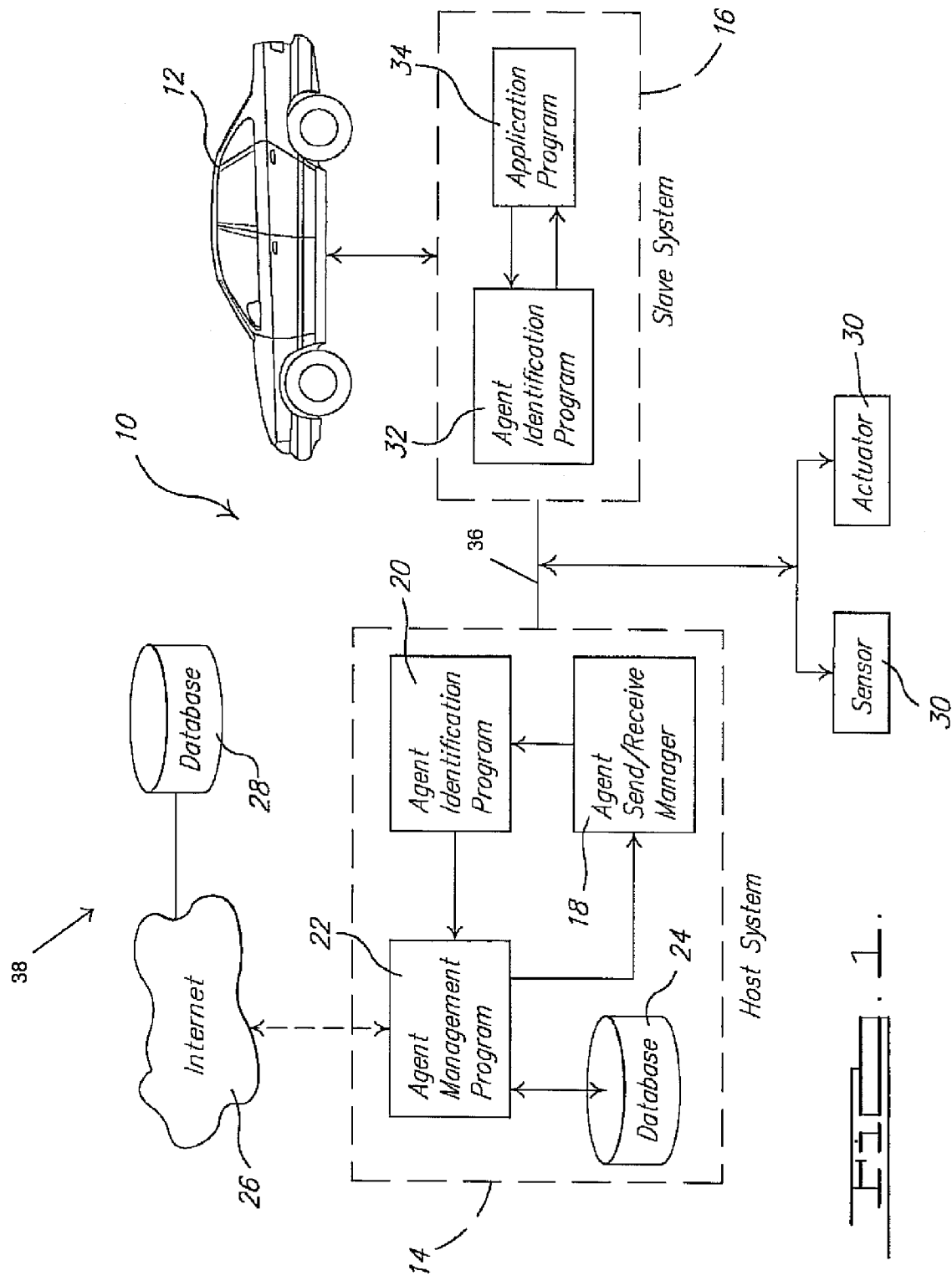
FIG. 1 is a diagrammatic view of a system for use in conjunction with a method of agent identification in an electronic system, according to the present invention.

Referring to FIG. 1, a system for agent identification 10 in an electronic system is provided. In this example, the electronic system is incorporated in a vehicle 12, and in particular an automobile. The vehicle electronic system includes an intelligent diagnosis and repair feature. Expert agents, each having a specific function, are dispersed within the electronic system of the vehicle in order to monitor its behavior.

The system for agent identification 10 includes at least one intelligent agent 30 disposed within the vehicle electronic system in a predetermined manner. For example, the agents 30 may be arranged in hierarchical layers. The agents 30 provide data that is analyzed and utilized by the vehicle. In this example, the data is used for intelligent vehicle diagnostics. The intelligent agent encompasses many forms. For example, the intelligent agent may be a sensing means, such as a sensor. The intelligent agent may be an electronic control having a microprocessor, a memory, an input, an output and necessary operating software. The intelligent agent may also be an Application Specific Integrated Circuit (ASIC) incorporated into a computer controller. As such, the system may include various types of agents, depending on the diagnostic task to be performed. One function of the agent 30 is to carry program code to a particular component in the electronic system of the vehicle. Recognition of the agent 30 is advantageous in preserving the integrity of the vehicle component. A non-identified agent 30 may carry code that could have a negative impact on the vehicle component.

The intelligent agent also carries an identification code, to be described, and identification information identifying the host computer system 14. The identification information is useful for identification verification purposes. The type of identification information may be a name or number or the like and the format is non-limiting.

The system for agent identification 10 includes a communication network 36 that selectively receives, transmits or monitors data communications between the various system components within the communication network. Various different types of communication means may be incorporated within the communication network 36. The connection between the various communication means may be wired or wireless or the like. An example of a wired connection means is a data bus. An example of a LAN/WAN communication means is an intranet or internet 26. The communication network may include other linked communication devices, such as facsimile, or telephone, pagers or cellular phones or the like.

The system for agent identification includes a host computer system 14 operatively in communication with a slave computer system 16 via the communication network 36. Both the host computer system 14 and slave computer system 16 are also operatively in communication with the agent 30 via the communication network 36. The host computer system 14 includes a processor, a memory means associated with the processor, a data storage device 24, an input/output interface means, and operational software programs. In this example, the host computer system is a server. It should be appreciated that various other peripheral devices may be connected to the host computer system 14, such as another remotely located data storage device 28, or a printer. Preferably, the host computer system is a central facility remotely located from the vehicle.

The memory means may be integral with the processor, or in communication with the processor via the communication network 36. There may be more than one memory means associated with the processor. An example of a memory means is a data storage device, including a fixed memory device, such as a hard drive or the like. Alternatively, the memory means is a removable memory, such as a memory stick, scan disc, compact disc or the like. The memory means may include a database of information that is beneficial to performing diagnostic fault isolation, such as a knowledge database or the like.

The host computer system 14 maintains several software programs. These software programs are preferably maintained in the memory means associated with the processor. An agent management software program 22 coordinates the various agents 30 disposed within the system. In particular, the agent management software program 22 coordinates activities such as the addition of an agent, the deletion of an agent, the education of an agent and the generation of an identification code for the agent. In this example, the agent management program also coordinates the diagnostic tasks performed by the agents. The agent management program 22 may select an agent that is appropriate for a predetermined vehicle operating condition to perform a task, such as sense information from a vehicle component. The agent management program 22 may collect information received by the agent. The agent management program 22 may perform a diagnostic analysis of the collected information, or transfer the information to another remotely located means 38 capable of performing diagnostics. The agent management program may further select another agent to perform a function based on the information collected by a lower level agent.

Another software program is the agent send and receive manager software program 18. This software program coordinates communications between the host system 14 and a slave system 16. It should be appreciated that in this example, the send/receive manager 18 selects which slave system 16 will receive a predetermined agent. The selection of a particular slave system to receive the agent and process the information carried by the agent may be beneficial in balancing the work load between various slave systems. That is, an ECU with a high task load may be avoided in favor of an ECU with a lower task load. The agent send/receive manager 18 also may keep track of the incoming and outgoing agents within the host computer system, to assist in the identification of each incoming or outgoing agent.

A further software program is the host agent identification software program 20. This software program identifies the agent 30 entering the host computer system 14 using the methodology to be described. The host agent identification software program 20 advantageously distinguishes between an allowable agent and an illegal agent. The host agent identification software program 20 is operatively in communication with the host agent management program 22 and the host agent send/receive manager program 18.

The system also includes a slave computer system 16 which is located at the vehicle level. An example of a slave computer system 16 for a vehicle is an electronic control unit, or ECU. The slave computer system 16 includes an input means, a processor, a memory means associated with the processor, a communication means and an output means. There may be more that one memory means associated with the processor. An example of a memory means is a data storage device. For example, the data storage device may be a fixed memory device, such as a database or the like. Alternatively, the memory means is a removable memory, such as a memory stick, memory card or the like.

The slave computer system maintains several software programs. These software programs are preferably maintained in the memory means associated with the processor. One software program is the slave agent identification program 32. This software program is similar to the host identification program 20 and identifies the agent entering the slave computer system 16 using the methodology to be described. The slave agent identification program 32 is operatively in communication with the host agent send/receive manager software program 18 via the communication network 36. The agent is sent to a selected slave system by the host agent send/receive software program 18.

Another software program within the slave computer system is an application software program 34. This software program executes the program code carried by the identified agent, such as instructions to perform a particular function. This function may include data logging, user input or output, or diagnostics or the like.

The system for agent identification 10 may include other components or features relevant to the above-described system and the method to be described. For example, the system may include an indicator means for providing a message to the vehicle operator. The indicator means may be a visual means, such as an LED, CRT or LCD display or the like; or an audio means, such as a voice alarm or sound alarm or the like;

or any other means of alerting the vehicle operator. The system may include an interactive means for transmitting an input from the vehicle operator to the intelligent diagnostic system.

Referring to FIG. 2, a method of intelligent agent identification is provided. The method is implemented by an agent identification system 10 described with respect to FIG. 1. The methodology identifies an agent 30 seeking entry into either the host computer system 14 or the slave computer system 16. The methodology begins in block 100 and continues to block 105. In block 105, the host system determines a destination slave computer system to receive a selected agent. It should be appreciated that in this example, the agent selection is made by the host agent management program 22 and the receiving or destination slave system is determined by the host send/receive software program 18. Various factors may be considered in selecting the slave system, such as the availability of the slave system, the location of the slave system, or the like. As previously described, the slave computer system is at the vehicle level.

The methodology advances to block 110 and the program code containing the work to be accomplished within the destination slave system is encrypted. Various encryption techniques are available in the art. It should be appreciated that the encryption may be performed at the host or alternatively the slave level. A non-limiting example of an encryption technique is the Data Encryption Standard (DES), a symmetric algorithm adopted in the United States as a federal standard. Another technique is the International Data Encryption Algorithm (IDEA). Other commonly available asymmetric techniques are the RSA algorithm, Pretty Good Privacy (PGP), Secure Sockets Layer (SSL), and Secure Hypertext Transfer Protocol (S-HTTP). A Clipper algorithm (called Skipjack) is specified in the Escrow Encryption Standard (EES), a voluntary federal standard for encryption of voice, facsimile (fax), and data communications over ordinary telephone lines.

The methodology advances to block 115 and a specific identification number is generated for the selected agent. In this example, the identification number is generated by the host agent management software program. Preferably, the identification number is a randomly generated number. Various random number generating techniques are available in the art. It should be appreciated that it is desirable to utilize a technique that generates a number that cannot be readily decoded by an outsider. The randomly generated number may be a specified length, and include character types such as numeric, alphanumeric or alphabetic or the like.

The methodology advances to block 120 and identification information relevant to the host computer system 14 is encrypted using an available technique, as previously described.

The methodology advances to block 125, and an identification code for the selected agent is determined using one or more randomly generated identification numbers. In this example, the identification code contains three identification numbers. The methodology advances to block 130, and the identification code is programmed into the selected agent.

The methodology advances to block 135, and the selected agent 30 is transmitted to the previously determined slave computer system. The agent 30 is transmitted via a communication means within the communication network 36 as previously described. The agent 30 is received within the slave computer system 16 and processed by the slave agent identification software program 32.

The methodology advances to block 140, and the slave agent identification software program 32 separates the identification code carried by the agent 30 back into the identification numbers, which in this example is three. Separating out the identification numbers in the identification code improves the security of the system. The methodology advances to block 145 and the encrypted agent identification code and host identification information is decoded by the slave identification software program. As previously described, various techniques are generally available in the art to decode information.

The methodology advances to decision block 150 and it is determined by the slave agent identification software program 32 whether the decoded host information correlates with host information maintained by the slave system 16. In this example, the three identification codes are individually deciphered, and each deciphered identification code is individually verified. Again, the multiple redundancies improve the security of the system. It should be appreciated that the slave computer system 16 and host computer system 14 utilize the same decipherment rule in comparing the code carried by the selected agent. If the decoded information from any one of the identification codes does not correlate, then the selected agent is not identifiable and the methodology advances to block 200.

In block 200, the non-identifiable agent is denied access to the slave system. For example, the agent may be deleted by the slave system by erasing the agent from the memory of the slave system.

The methodology advances to block 205 and ends.

Returning to decision block 150, if the decoded host information does correlate with the host information maintained by the slave agent identification software program 32, the methodology advances to decision block 155 and continues to check the identity of the selected agent 30 seeking entry into the slave system 16.

In decision block 155, the methodology determines if the agent identification code correlates with a predetermined condition. One example of a predetermined condition is an identification code stored in a memory associated with the slave identification software. If the identification code does not correlate, the agent is not identified, and the methodology advances to block 200 and continues. If the identification code does correlate with the predetermined condition, the agent is identifiable, and the methodology advances to block 160 and continues. It should be appreciated that the three identification codes of this example are individually deciphered, and each identification code is individually verified to enhance the security of the system.

In block 160, the methodology decodes the program code carried by the agent. It should be appreciated that the program code may contain work instructions for the agent. The slave application program 34 executes the work instructions with the assistance of the agent and obtains information. In this example, the information is useful in the diagnostics of the electronic system of the vehicle. One example of a work instruction is to sense a temperature of predetermined component. Another example of a work instruction is to sense a speed of a predetermined component. The methodology advances to block 165.

In block 165, the methodology encrypts the information obtained by the agent through the slave application program 34, using an encryption technique previously described. Information unique to the slave system is also encrypted and stored in a memory associated with the agent. The content of the work performed by the slave system may be encrypted and stored in a memory associated with the agent. It should be appreciated that these redundant encryption steps improve the security of the system.

The methodology advances to block 170 and an identification code for the agent is reconfigured using the randomly generated numbers by the slave identification software program. The identification code is stored on the agent and the agent is transmitted back to the host system via the communication network.

In block 175, the host system receives the agent through the host send/receive software program 18. In block 180, the host identification software program 20 decodes the information carried by the agent, including the identification code, processing result from the application program and any other information. Any additional information on the agent is also decoded and separated out. The decoding is accomplished using a generally known decoding technique, as previously described.

The methodology advances to decision block 185. In decision block 185, the methodology determines if the identification number carried by the agent seeking entry correlates with a predetermined identification number maintained by host identification software program 20. If the identification number does not correlate, the agent is not identifiable and the methodology advances to block 200 and continues. If the identification number does correlate, the agent is identifiable and the methodology advances to decision block 190.

In decision block 190, it is determined if the received information carried by the agent correlates with a predetermined condition. One example of a predetermined condition is if a sensed temperature is within a predetermined range of temperatures. If the information does not correlate, the agent seeking entry is not identifiable by the host identification software program and the methodology advances to block 200 and continues. If the information does correlate, the methodology advances to block 195.

In block 195, the methodology transmits the information from the agent to a predetermined application for diagnostic analysis. The predetermined application may be part of the host computer system 14, or a remotely located diagnostic computer system 38.

The methodology advances to block 205 and ends.

It should be appreciated that the methodology may include other steps necessary for the implementation of the method. Further, the steps may be executed in another order, while achieving the same result.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent agent identification for a vehicle, said method including the steps of:

selecting an intelligent agent by a host computer system, wherein the host computer system includes a processor, a memory associated with the processor and an input/output means, the memory having a plurality of identification numbers and a plurality of predetermined identification codes generated using at least one of the identification numbers;

selecting a slave system to receive the intelligent agent, by the host computer system;

encrypting a work activity to be performed by the intelligent agent, and encrypting predetermined host computer system identification information and programming the encrypted work activity and predetermined host computer system identification information into the selected intelligent agent by the host computer system;

selecting an identification code for the selected intelligent agent by the host computer system and programming the identification code into the selected intelligent agent;

transmitting the intelligent agent to the selected slave system, wherein the selected slave system includes a slave computer system having a processor, a memory associated with the processor and an input/output means, the memory having the plurality of identification numbers and the plurality of predetermined identification codes generated using the identification numbers, and the host computer system and slave computer system are operatively in communication with each other via a communication network;

decoding the host computer system identification information carried by the selected intelligent agent by the slave computer system;

determining if the decoded host computer system identification information matches corresponding host computer system identification information stored in the memory of the slave computer system;

denying access to the slave computer system if the decoded host computer system identification information carried by the intelligent agent does not correspond with host computer system identification information stored in the memory of the slave computer system;

continuing to check the identity of the intelligent agent if the decoded host computer system identification information carried by the intelligent agent does correspond with host computer system identification information stored in the memory of the slave computer system, by deciphering the identification code into the identification numbers and determining if the identification code and the identification numbers match the predetermined identification code and the identification numbers stored in the memory of the slave computer system;

denying access to the slave computer system if either of the identification code or the identification numbers carried by the intelligent agent do not match the predetermined identification code or the identification numbers stored in the memory of the slave computer system; and allowing the intelligent agent access to the slave computer system if the identification code and the identification numbers carried by the intelligent agent matches the predetermined identification code and identification numbers stored in the memory of the slave computer system.

2. A method as set forth in claim 1 further including the steps of:

decoding the work activity carried by the intelligent agent if the intelligent agent is identified;

executing the work activity by the slave computer system and using the intelligent agent to obtain work activity information;

encrypting the work activity information obtained using the intelligent agent by the above computer system and programming the encrypted work activity information into the intelligent agent;

regenerating the identification code from the identification numbers for the intelligent agent by the slave computer system and programming the identification code into the intelligent agent;

transmitting the intelligent agent to the host computer system and receiving the intelligent agent by the host computer system;

deciphering the identification code into the identification numbers, and decoding the work activity information carried on the intelligent agent, by the host computer system;

determining if the identification code and the identification numbers correlates with a predetermined identification code and the identification numbers for the intelligent agent stored in the host computer system;

denying the intelligent agent access to the host computer system, if the identification code and the identification numbers do not match the predetermined identification code and the identification numbers for the intelligent agent;

continuing to check the agent identity if the identification code and the identification numbers carried by the intelligent agent do correspond with the predetermined identification code and the predetermined identification numbers stored in the memory of the host computer system, by determining if the decoded work activity information matches a predetermined work information condition;

denying access to the host computer system if the decoded work activity information carried by the intelligent agent does not match the predetermined work information condition; and using the work activity information carried on the intelligent agent in vehicle diagnostics, if the decoded information carried on the intelligent agent matches the predetermined work information condition.

3. A method as set forth in claim 2 wherein said host computer system includes a host agent management software program for managing the intelligent agent.

4. A method as set forth in claim 3 wherein the host computer system includes a host agent identification software program for identifying the intelligent agent.

5. A method as set forth in claim 4 wherein said host computer system includes an agent send/receive manager that manages ingress and egress of intelligent agents to the host computer system.

6. A method as set forth in claim 2 wherein said slave computer system includes an agent identification software program for identifying the intelligent agent.

7. A method as set forth in claim 6 wherein said slave computer system includes a slave application software program for executing the work activity by the intelligent agent.

8. A method as set forth in claim 1 wherein said predetermined identification codes are generated using a predetermined number of identification numbers, and wherein each of the predetermined number of identification numbers are individually compared to the identification numbers stored in the memory of the slave computer system.

9. A method of intelligent agent identification for a vehicle, said method including the steps of:

selecting an intelligent agent by an agent management software program maintained on a host computer system, wherein the host computer system includes a processor, a memory associated with the processor and an input/output means, the memory having a plurality of identification numbers and a plurality of predetermined identification codes generated using at least one of the identification numbers;

selecting a slave system to receive the intelligent agent using a host send/receive software program maintained by the host computer system;

encrypting a work activity to be performed by the intelligent agent, and encrypting predetermined host computer system identification information and programming the encrypted work activity and predetermined host computer system identification information into the selected intelligent agent;

generating a plurality of identification numbers for the selected agent by the host computer system;

selecting an identification code for the selected intelligent agent using the host agent management software program and programming the identification code into the selected intelligent agent;

transmitting the intelligent agent to the selected slave system, wherein the selected slave system includes a slave computer system having a processor, a memory associated with the processor and an input/output means, the memory having the plurality of identification numbers and the plurality of predetermined identification codes generated using the identification numbers, and the host computer system and slave computer system are operatively in communication with each other via a communication network;

decoding the host computer system identification information carried by the selected intelligent agent by a slave identification software program maintained by the slave computer system;

determining if the decoded host computer system identification information matches corresponding host computer system identification information stored in the memory of the slave computer system;

denying access to the slave computer system if the decoded host computer system identification information carried by the intelligent agent does not correspond with host computer system identification information stored in the memory of the slave computer system;

continuing to check the identity of the intelligent agent if the decoded host computer system identification information carried by the intelligent agent does correspond with host computer system identification information stored in the memory of the slave computer system, by deciphering the identification code into the identification numbers and determining if the identification code and the identification numbers matches the predetermined identification code and the identification numbers stored in the memory of the slave computer system;

denying access to the slave computer system if either of the identification code or the identification numbers carried on the intelligent agent does not match the predetermined identification code or the identification numbers stored in the memory of the slave computer system;

decoding the work activity carried by the intelligent agent if the identification code and the identification numbers carried on the intelligent agent matches the predetermined identification code and predetermined identification numbers stored in the memory of the slave computer system;

executing the work activity by the slave computer system and using the intelligent agent to obtain work activity information;

encrypting the work activity information obtained by the intelligent agent using the slave application program on the slave computer system and programming the encrypted work activity information into the intelligent agent;

regenerating the identification code from the identification numbers for the intelligent agent by the slave identification software program and programming the identification code into the intelligent agent;

transmitting the intelligent agent to the host computer system and receiving the intelligent agent by the host agent send/receive software program;

decoding the work activity information and separating the identification code from the identification numbers carried on the intelligent agent, by the host identification software program;

determining if the identification code and the identification numbers correlates with a predetermined identification code and the identification numbers for the intelligent agent stored in the host computer system by the host identification software program;

denying the intelligent agent access to the host computer system, if the identification code and the identification numbers do not match the predetermined identification code and the identification numbers for the intelligent agent;

continuing to check the agent identity if the identification code and the identification numbers carried by the intelligent agent do correspond with the predetermined identification code and the predetermined identification numbers stored in the memory of the host computer system, by determining if the decoded work activity information matches a predetermined work information condition;

denying access to the host computer system if the decoded work activity information carried by the intelligent agent does not match the predetermined work information condition; and using the work activity information carried by the intelligent agent in vehicle diagnostics, if the decoded information carried on the intelligent agent matches the predetermined work information condition.

10. A method as set forth in claim 9 wherein said step of predetermined identification codes are generated using a predetermined number of identification numbers, and wherein each of the predetermined number of identification numbers are individually compared to the identification numbers stored in the memory of the slave computer system.

11. A system of intelligent agent identification and management for a vehicle having an intelligent agent, comprising:

a host computer system having a processor, a memory associated with the processor and an input/output means, a host agent send/receive software program maintained by the host computer system that admits the intelligent agent into the host computer system and sends the intelligent agent out of the host computer system, the memory having a plurality of identification numbers and a plurality of identification codes generated using at least one of the identification numbers;

a host identification software program maintained by the host computer system that manages the identity of the intelligent agent and the activity of the intelligent agent;

an agent management software program operatively maintained by the host computer system, wherein the agent management software program selects an intelligent agent and a slave system to receive the intelligent agent, encrypts an action to be performed by the intelligent agent, selects an identification code for the selected intelligent agent, encrypts the host computer system identification information and programs the generated identification code and host computer system identification information onto the selected intelligent agent;

a slave computer system on the vehicle that is operatively in communication with the host computer system via a communication network, wherein the slave computer system has a processor, a memory associated with the processor and an input/output means, the memory having the plurality of identification numbers and the plurality of predetermined identification codes generated using at least one of the identification numbers;

a slave identification software program maintained by the slave computer system, wherein the slave identification program identifies the intelligent agent received by the slave computer system by decoding the host computer system identification information carried by the selected intelligent agent, determines if the decoded host computer system identification information matches corresponding host computer system identification information stored in memory of the slave computer system, and denies access to the slave computer system if the decoded host computer system identification information carried by the intelligent agent does not correspond and continues to check the identity of the agent by deciphering the identification code into the identification numbers and determines if the identification code and the identification numbers match a predetermined identification code and the identification numbers stored in the memory of the slave computer system and denies the intelligent agent access to the slave computer system if the identification code and the identification numbers do not match the predetermined identification code and the identification numbers stored in the memory of the slave computer system and decodes the information carried by the intelligent agent if the decoded information carried by the intelligent agent matches the predetermined condition; and a slave application software program that is part of the slave computer system that executes the work activity instructions carried by the identified agent to obtain information about the vehicle that is used in vehicle diagnostics.

12. A system as set forth in claim 11, wherein said agent identification software program encrypts the work activity information obtained by the identified intelligent agent, regenerates and programs the identification code using the identification numbers, into the intelligent agent, and transmits the intelligent agent to the host computer system.

13. The system as set forth in claim 12 wherein the host identification software program decodes the information carried by the intelligent agent, determines if the identification code and the identification numbers correlate with a predetermined identification code and the identification numbers for the intelligent agent, and denies the intelligent agent access to the host computer system if the identification code and the identification numbers do not match the predetermined identification code and the identification numbers and continues to check the identity of the intelligent agent if the identification code and the identification numbers correspond with the predetermined identification code and the identification numbers and determines if the received work activity information matches a predetermined work activity condition and denies access to the host computer system if the work activity information does not match the predetermined condition and uses the work activity information carried by the intelligent agent in vehicle diagnostics.

14. A system as set forth in claim 12 wherein the predetermined identification code are generated using a predetermined number of identification numbers, and wherein each of the predetermined number of identification numbers are individually compared to the identification numbers stored in the memory of the slave computer system.

* * * * *